United States Patent [19]

Okimoto et al.

[11] Patent Number: 4,614,173

[45] Date of Patent: * Sep. 30, 1986

[54] INTAKE SYSTEM FOR ROTARY PISTON ENGINE

[75] Inventors: Haruo Okimoto; Ikuo Matsuda, both of Hiroshima, Japan

[73] Assignee: Mazda Motor Corporation, Hiroshima, Japan

[ * ] Notice: The portion of the term of this patent subsequent to Jan. 7, 2003 has been disclaimed.

[21] Appl. No.: 613,356

[22] Filed: May 23, 1984

[30] Foreign Application Priority Data

May 25, 1983 [JP] Japan .................................. 58-93113

[51] Int. Cl.⁴ .............................................. F02B 53/04
[52] U.S. Cl. ...................................... 123/216; 123/242
[58] Field of Search .................... 123/216, 242, 52 M, 123/219; 60/602

[56] References Cited

U.S. PATENT DOCUMENTS

| | | |
|---|---|---|
| 3,370,575 | 2/1968 | Soubis . |
| 3,491,733 | 1/1970 | Soubis ..................... 123/52 |
| 3,796,048 | 3/1974 | Annus et al. . |
| 4,020,800 | 5/1977 | Ishikawa . |
| 4,259,840 | 4/1981 | Tenney ..................... 60/602 |
| 4,388,907 | 6/1983 | Sugo et al. ............... 123/494 |
| 4,423,711 | 1/1984 | Tadokoro et al. ......... 123/242 |
| 4,425,883 | 1/1984 | Tadokoro et al. ......... 123/242 |
| 4,562,803 | 1/1986 | Tadokoro et al. ......... 123/216 |
| 4,562,804 | 1/1986 | Tadokoro et al. ......... 123/216 |
| 4,562,805 | 1/1986 | Tadokoro et al. ......... 123/216 |
| 4,566,412 | 1/1986 | Tadokoro et al. ......... 123/216 |

FOREIGN PATENT DOCUMENTS 53-24909  3/1978  Japan ..................................  123/216

*Primary Examiner*—Michael Koczo
*Attorney, Agent, or Firm*—Fleit, Jacobson, Cohn & Price

[57] ABSTRACT

A multiple rotor type rotary piston engine includes an intake system of individual intake ports provided in at least one of the intermediate and side housings to open to the respective rotor cavities and being cyclically closed by the rotors as the rotor rotate, an intake passage including a common passage and individual passages divided from the common passage and leading respectively to the intake ports, the individual passages being communicated with each other by communicating passages. The intake passage is provided with a turbo-supercharger having a waste gate valve for limiting the intake pressure below a predetermined value so that there is produced an engine operating zone wherein the intake pressure is lower than the exhaust gas pressure. The communication passages and the individual passages leading to the respective rotor cavities have such an overall length that a compression wave produced in one individual passage in opening timing of one intake port is transmitted to the other intake port just before the other intake port is closed to obtain an additional charge in the aforementioned engine operating zone.

7 Claims, 8 Drawing Figures

INTAKE SYSTEM FOR ROTARY PISTON ENGINE

The present invention relates to rotary piston engines, and more particularly to intake systems for rotary piston engines. More specifically, the present invention pertains to side port type intake systems for multi-rotor rotary piston engines.

In general, a rotary piston engine includes a casing comprised of a rotor housing having an inner wall of trochoidal configuration, a pair of side housings secured to the opposite sides of the rotor housing to define a rotor cavity in the rotor housings. A rotor of substantially polygonal configuration is disposed in the rotor cavities and has flanks which define, with the inner wall of the rotor housing, working chambers having volumes which are cyclically changed as the rotor rotates. The rotor housing is generally formed with an exhaust port whereas the side housings are formed with intake ports so that intake, compression, combustion, expansion and exhaust cycles are conducted sequentially in each of the working chambers.

In this type of rotary piston engines, it has been proposed to utilize pulsations in the intake passage so that effective feed of intake gas can be accomplished throughout a wide range of the engine operating speed. For example, the U.S. Pat. No. 3,491,733 issued on Jan. 27, 1970 to Soubis et al. teaches to separate the intake passage into two passages of different lengths and connect these separated passages to two separated intake ports having different port closing timings so that the two passages and the two intake ports are used under a high speed engine operation whereas only one passage and only one intake port having earlier port closing timing are used under a low speed engine operation. With this arrangement, it is possible to feed the intake charge with resonance under a wide engine operating speed.

It should however be noted that the U.S. patent relates to a single rotor type rotary piston engine and there is no precise teaching as to how the pulsations in the passages are utilized. Further, the U.S. patent discloses a so-called peripheral port type rotary piston engine having the intake ports provided in the rotory housing. This type of engine is considered disadvantageous in that the intake ports are overlapped with the exhaust port so that the exhaust gas is blown under its own pressure into the intake working chamber decreasing the intake gas charge. In engines of recent years, there is a tendency that the exhaust gas pressure is increased due to facilities for suppressing engine noise and for purifying engine exhaust gas. In engines having turbosuperchargers, the exhaust gas pressure is further increased. Therefore, the peripheral port type intake system is not satisfactory to increase the intake charge utilizing the resonance effect.

In view of the above problems, there is proposed in the copending U.S. patent application Ser. No. 555,534 filed on Nov. 28, 1983, now U.S. Pat. No. 4,566,412, to provide a side port type intake system for two-rotor type rotary piston engines which can effectively prduce a pressure resonance effect. This proposal is based on the findings that a compression wave is produced when the intake port is opened in the vicinity of the intake port under the influence of the pressure of the residual combustion gas and that there is a tendency in recent engines that the compression wave is intensified due to the increase in the exhaust gas pressure. Thus, according to the proposal, the compression wave produced in one intake passage leading to one rotor cavity is transmitted through the other intake passage to the intake ports opening to the other rotor cavity just before the particular intake ports are closed to produce a pressure resonance intake charging effect. It should however be noted that the copending application does not teach how the concept of utilizing the pressure resonance intake charging effect can be applied to a supercharged rotary piston engine. As well known in the art, in a supercharged engine, the intake pressure is usually higher than the exhaust gas pressure so that it is generally considered that the pressure resonance effect can hardly be utilized.

It is therefore an object of the present invention to provide a supercharged rotary piston engine having an intake system in which the pressure resonance intake charging effect can be utilized.

Another object of the present invention is to provide a supercharged multi-rotor type rotary piston engine having a side port type intake system in which pulsating pressure produced in one rotor cavity due to a pressure of residual combustion gas is transmitted to another rotor cavity to produce a pressure resonance intake charging effect.

According to the present invention, there is provided a multiple rotor type rotary piston engine including a casing comprised of a plurality of rotor housings each having an inner wall of trochoidal configuration, an intermediate housing located between each pair of adjacent rotor housings and a pair of side housings secured to outer sides of outermost rotor housings to define rotor cavities in the respective rotor housings, a substantially polygonal rotor disposed in each of the rotor cavities with apex portions in sliding engagement with the inner walls of the respective rotor housings to define working chambers of cyclically variable volumes, said rotors being carried by eccentric shaft means so that said rotors are rotated with equal phase differences in terms of angle of rotation of said eccentric shaft means, intake means including individual intake port means provided in at least one of said intermediate and side housings to open to the respective rotor cavities and adapted to be cyclically closed by said rotors as the rotor rotates, intake passage means including individual passage means leading respectively to said intake port means and communicated with each other by communicating passage means, supercharging means located in said intake passage means upstream of said communicating passage means, exhaust port means provided in said casing to open to the respective rotor cavities and communicating with exhaust passage means, the improvement comprising intake pressure limiting means for limiting intake pressure in said intake passage means downstream the supercharging means below a predetermined value so that there is produced an engine operating range wherein the intake pressure is lower than exhaust gas pressure, said individual passage means and said communicating passage means having lengths such that a compression wave produced at the intake port means for one rotor cavity when said intake port means is opened is transmitted to the intake port means for another rotor cavity just before the last mentioned intake port means is closed in at least a part of said engine operating range.

In case where the present invention is applied to a rotary piston engine having three or more rotors, it is preferable that the individual passage means for two rotor cavities wherein intake strokes successively take place and the communicating passage means for the just mentioned individual passage means have an overall length which is equal to a corresponding length for further two rotor cavities wherein intake strokes successively take place. Further, it is also preferable that the lengths of the individual passage means and the communication passage means are such that the compression wave produced at the intake port means for one rotor cavity when the intake port means is opened is transmitted to another intake port means which closes at the earliest timing after the first mentioned intake port means is opened just before said another intake port means is closed.

In supercharged engines, it has been well known to limit the intake pressure below a predetermined value. The purpose of this arrangement is to prevent knocking or other abnormal combustion. The present invention is distinguishable from the prior art in that the intake pressure is limited to such a value that there is produced an engine operating range wherein the intake pressure is lower than exhaust gas pressure and the intake passage means is so designed that a further supercharging effect is obtained in the engine operating zone through a pressure resonance effect. Where supercharging is accomplished only by a supercharger throughout the engine operating range, the load on the supercharger is increased as the required intake pressure is increased so that the power for driving the supercharger is correspondingly increased. In case where the supercharger is of a type driven by an exhaust turbine, the load of the turbine will become very large resulting in an increase in the exhaust gas pressure so that economy of supercharging is substantially lost. According to the present invention, however, the supercharging pressure is limited so that the supercharger can be economically driven. Further, since an additional charge is obtained by the pressure resonance effect in the engine operating zone wherein the intake pressure is limited, a required engine output can be obtained without increasing the driving effort of the supercharger.

The above and other objects and features of the present invention will become apparent from the following descriptions of preferred embodiment taking reference to the accompanying drawings, in which.

Figure 1:
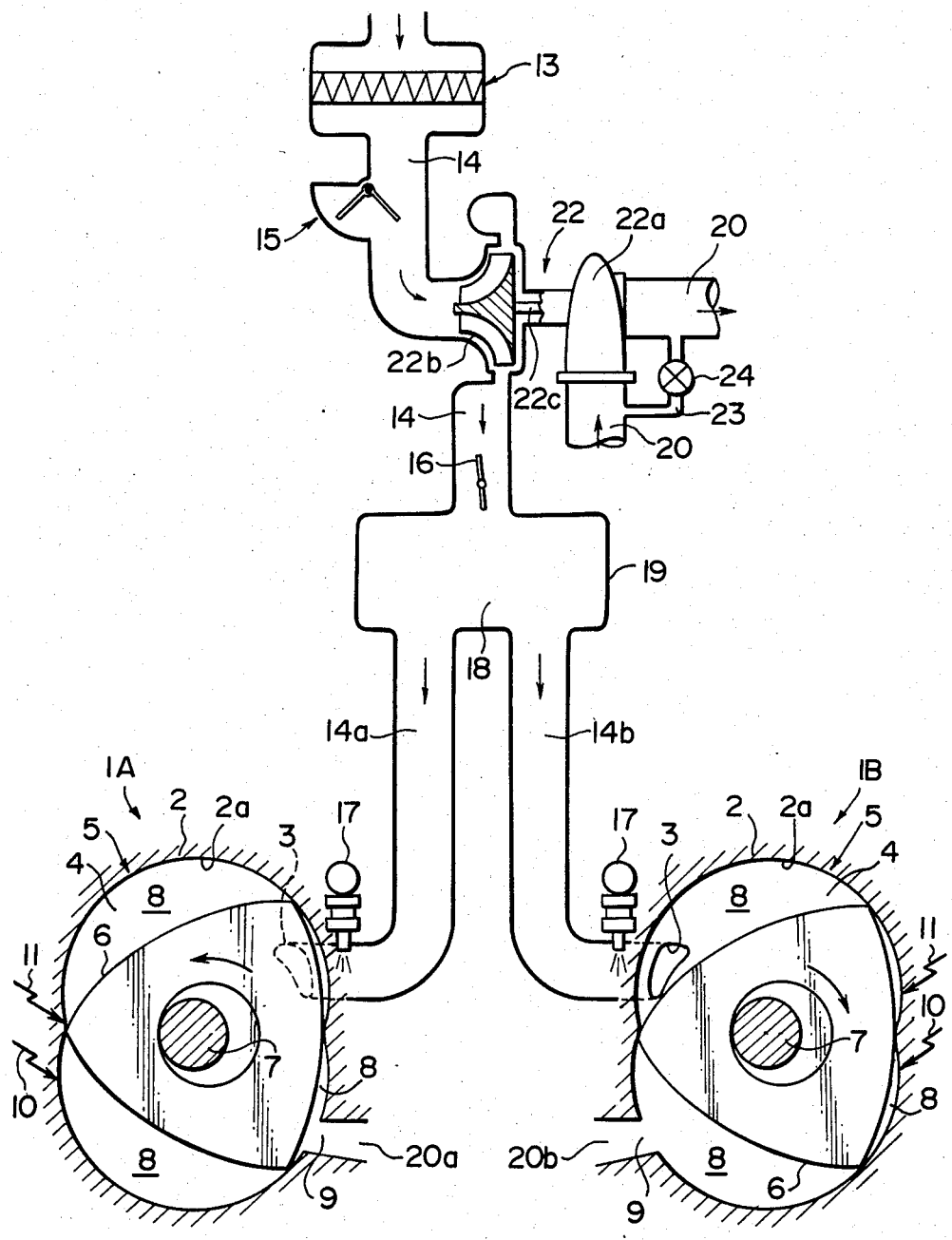
FIG. 1 is a schematic illustration of a tworotor type rotary piston engine in accordance with one embodiment of the present invention.
Figure 2:
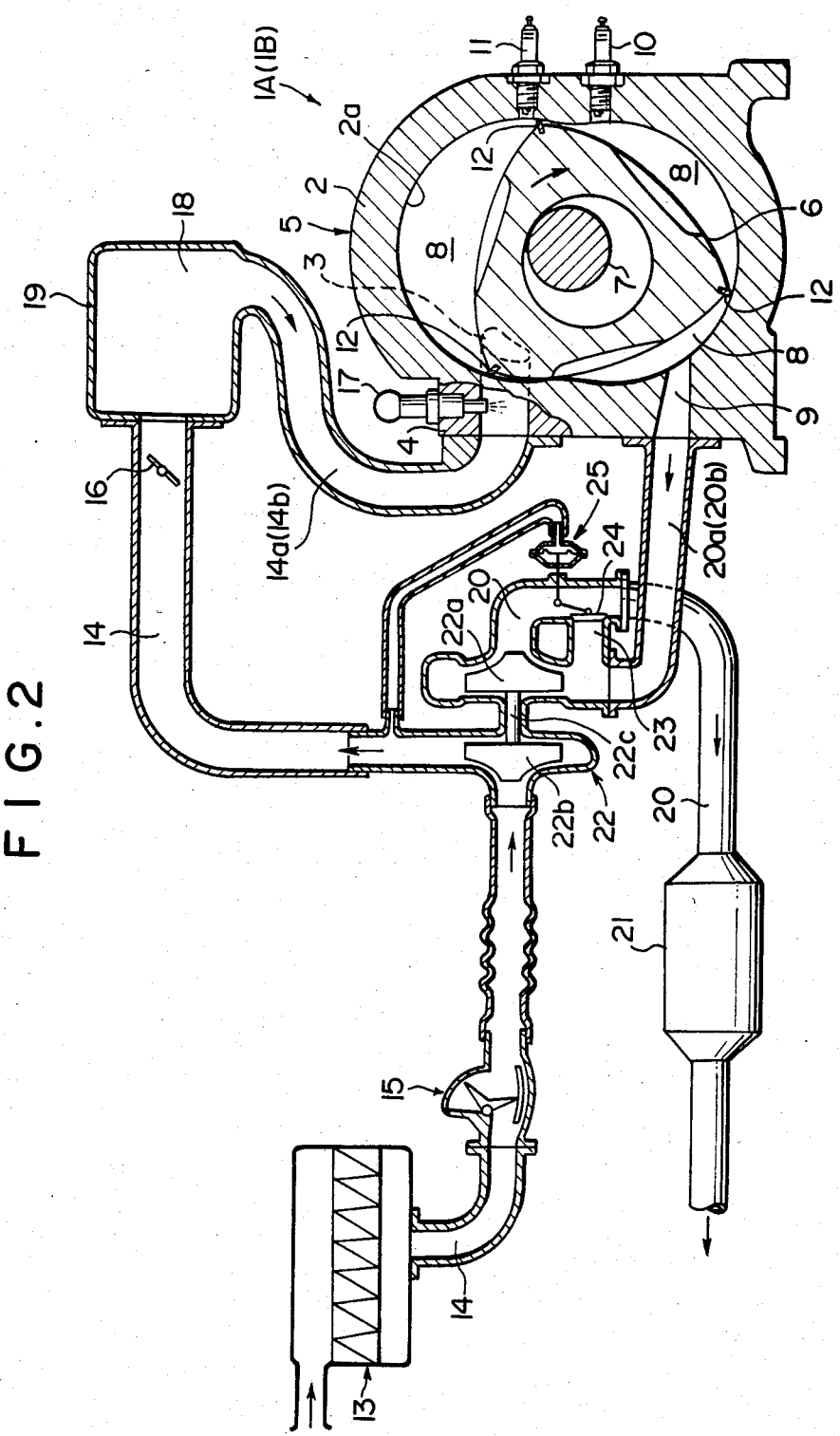
FIG. 2 is a sectional view of the engine shown in FIG. 1.
Figure 3:
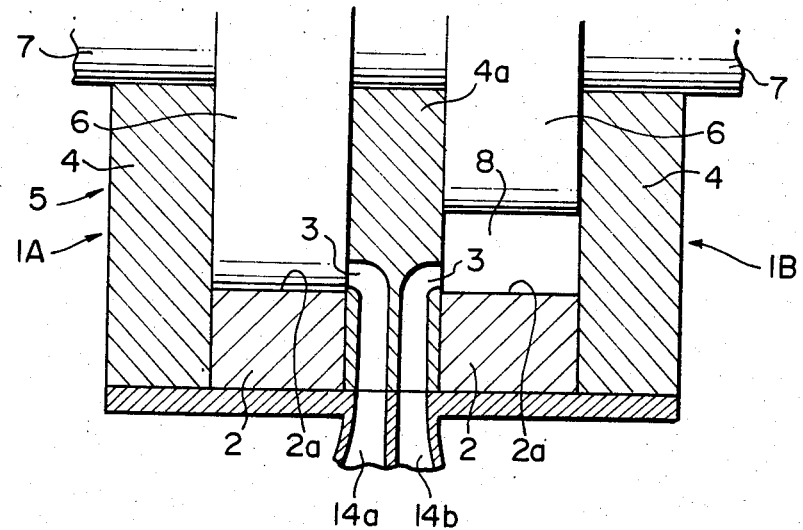
FIG. 3 is a sectional view along the axis of the eccentric shaft.

Referring to the drawings, particularly to FIGS. 1 through 3, there is shown a two-rotor type rotary piston engine comprised of a pair of engine sections 1A and 1B. The engine sections 1A and 1B respectively have rotor housings 2 which are formed with inner walls 2a of trochoidal configuration. An intermediate housing 4a is located between the rotor housings 2 to separate them one from the other as shown in FIG. 3. The outer sides of the rotor housings 2 are attached with side housings 4. Thus, the rotor housings 2, the side housings 4 and the intermediate housing 4a constitute a casing 5 in which a pair of rotor cavities are defined. In the intermediate housing 5a, there are formed intake ports 3 respectively opening to the rotor cavities.

In each of the rotor cavities, there is disposed a rotor 6 of substantially triangular configuration. The rotors 6 are carried by an eccentric shaft 7 and have apex portions provided with apex seals 12 and corner seals (not shown). Further, the rotors 7 are provided at their side surfaces with side seals (not shown). The rotors 6 are rotatable with their apex seals 12 in sliding contact with the inner walls 2a of the rotor housings 2. The side seals are maintained in sliding contact with the surfaces of the side housings 4 and the intermediate housing 4a. Thus, in each of the rotor cavities in the casing 5, there are defined working chambers 8 of which volumes cyclically change as the rotor 6 rotates. The eccentric shaft 7 carries the rotors 6 with 180° phase difference between the rotors 6. The rotor housings 2 are formed with exhaust ports 9 and provided with ignition plugs 10 and 11. The exhaust ports 9 are connected with exhaust passages 20a and 20b leading to an exhaust manifold 20 which is provided with a catalytic device 21.

The intake system of the engine includes an air cleaner 13 connected with a common intake passage 14 provided with an air-flow detector 15. The common intake passage 14 leads to an expansion chamber 19 which in turn leads to individual passages 14a and 14b respectively connected with the intake ports 3 for the engine sections 1A and 1B. The expansion chamber 19 provides a communication passage 18 for the individual passages 14a and 14b. The intake passage 14 is provided upstream the expansion chamber 19 with a throttle valve 16 which is manually controlled by an engine control member to open in accordance with the engine load. In the vicinity of each intake port 3, the individual passage is provided with a fuel injecting nozzle 17.

As well known in the art, the intake ports 3 are cyclically opened by the rotors 6. Preferably, the opening period of each intake port 3 is 270° to 320° in terms of angle of rotation of the eccentric shaft 7.

Figure 6:
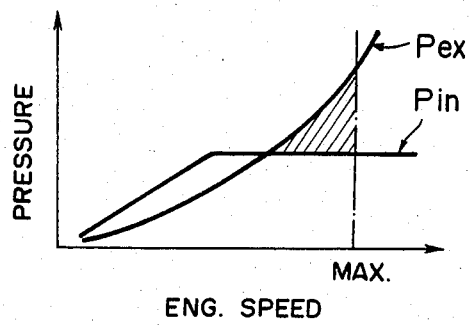
FIG. 6 is a diagram showing the relationship between the intake pressure and the exhaust gas pressure; and, FIGS. 7 and 8 are diagrams showing pressure resonance effect respectively in two-rotor and three-rotor type engines.

The intake system further has a turbo-supercharger 22 which comprises a turbine 22a disposed in the exhaust manifold 20 upstream the catalytic device 21 and a compressor 22b disposed in the common intake passage 14 between the airflow detector 15 and the throttle valve 16. The compressor 22b is connected through a shaft 22c with the turbine 22a which is driven by exhaust gas flow in the exhaust manifold 20. The exhaust manifold 20 is formed with a bypass passage 23 which bypasses the turbine 22a. In the bypass passage 23, there is provided a waste gate valve 24 which is actuated by a pneumatic actuator 25 responsive to the pressure in the intake passage 14 between the compressor 22b and the throttle valve 16. The actuator 25 functions to open the valve 24 when the pressure in the intake passage 14 between the compressor 22b and the throttle valve 16 exceeds a predetermined value. With this arrangement, it is possible to control the pressure Pin in the intake passage 14 as shown in FIG. 6. In FIG. 6, there is also shown a change in the exhaust gas pressure Pex. It will be noted in FIG. 6 that the waste gas valve 24 functions to limit the intake pressure Pin so that there is produced an engine operating zone wherein the intake pressure Pin is smaller than the exhaust pressure Pex as shown by a shadowed area. The actuator 25 may be adjusted so that the exhaust gas pressure Pex exceeds the intake pressure Pin at an engine speed of for example approximately 4000 rpm.

In the illustrated arrangement, the overall length L of the individual passages 14a and 14b and the communication passage 18 is determined to satisfy the following formula.

$$L = (\theta - 180 - \theta_o) \times (60/360N) \times C \quad (1)$$

where:
 $\theta$ is the intake port opening period;
 N is the engine speed;
 C is the sonic speed;
 $\theta_o$ is the inactive period which is the sum of the period between the opening timing of the intake port and generation of the compression wave, and the period required for accomplishing a satisfactory charge increase before the full close of the intake port, and this inactive period is approximately 20°.

It will thus be understood that the term $(\theta - 180 - \theta_o)$ represents the angle of rotation of the eccentric shaft 7 corresponding to the period from generation of the compression wave at one intake port 3 to the time at which the compression wave reaches the other intake port 3.

The term 60/360N represents the time period required for one revolution of the engine. Since the sonic speed C is 376 m/sec. at the temperature of 80° C. which is the intake air temperature of a supercharged engine, the length L becomes 0.63 to 1.50 m for the engine speed N of 5000 to 7000 rpm wherein the exhaust gas pressure is larger than the intake pressure by more than 100 mmHg. In the equation (1), the influence of the intake air flow on the propagation of the compression wave is neglected because the intake flow speed is small in relation to the sonic speed.

It should be noted that, according to the illustrated arrangement, the pressure resonance charging effect can be accomplished at the engine speed zone where the exhaust gas pressure exceeds the intake pressure. Since the communication passage 18 is provided by the expansion chamber 19, it is possible to transmit the compression wave without any significant attenuation.

Figure 7:
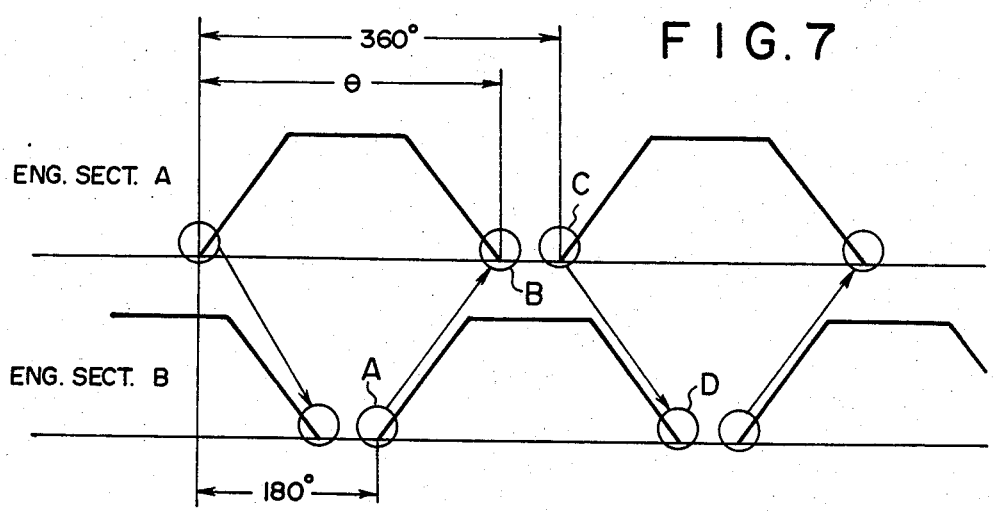

Referring now to FIG. 7, in operation of the engine under a speed corresponding to the shadowed area in FIG. 6, a compression wave is produced by the pressure of the residual combustion gas at the intake port 3 of one engine section, for example, the engine section 1B when the subject intake port 3 is opened as shown at A. The compression wave is transmitted through the individual passages 14a, 14b and the communication passage 18 to the intake port 3 of the other engine section, for example, the engine section 1A. Since the overall length L is determined as described previously, the compression wave reaches the intake port 3 in the said other engine section just before the subject intake port 3 is closed as shown by B. The compression wave functions to prevent blow-back of intake gas from the intake working chamber at the final stage of the intake stroke and provide an additional charge. Similarly, the compression wave produced at the intake port 3 of the engine section 1A as shown by C in FIG. 6 is transmitted to the intake port 3 of the engine section 1B just before the intake port 3 is closed as shown by D. Thus, it is possible to obtain an increase in the engine output torque. Since the communication passage 18 is located downstream the throttle valve 16 and the passage 18 has a large cross-sectional area, it is possible to prevent attenuation of the compression wave. It should further be noted that the fuel injection valves 17 are provided in the individual passages 14a and 14b, it is possible to obtain a satisfactory responsive characteristics irrespective of the fact that the intake passages are of substantial lengths.

Figure 5:
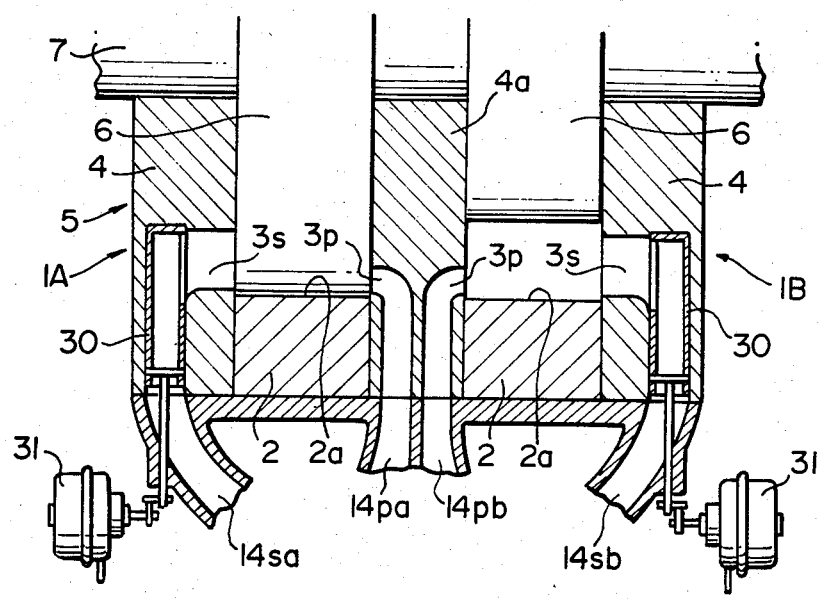
FIG. 5 is a sectional view similar to FIG. 3 but showing the embodiment shown in FIG. 4.
Figure 4:
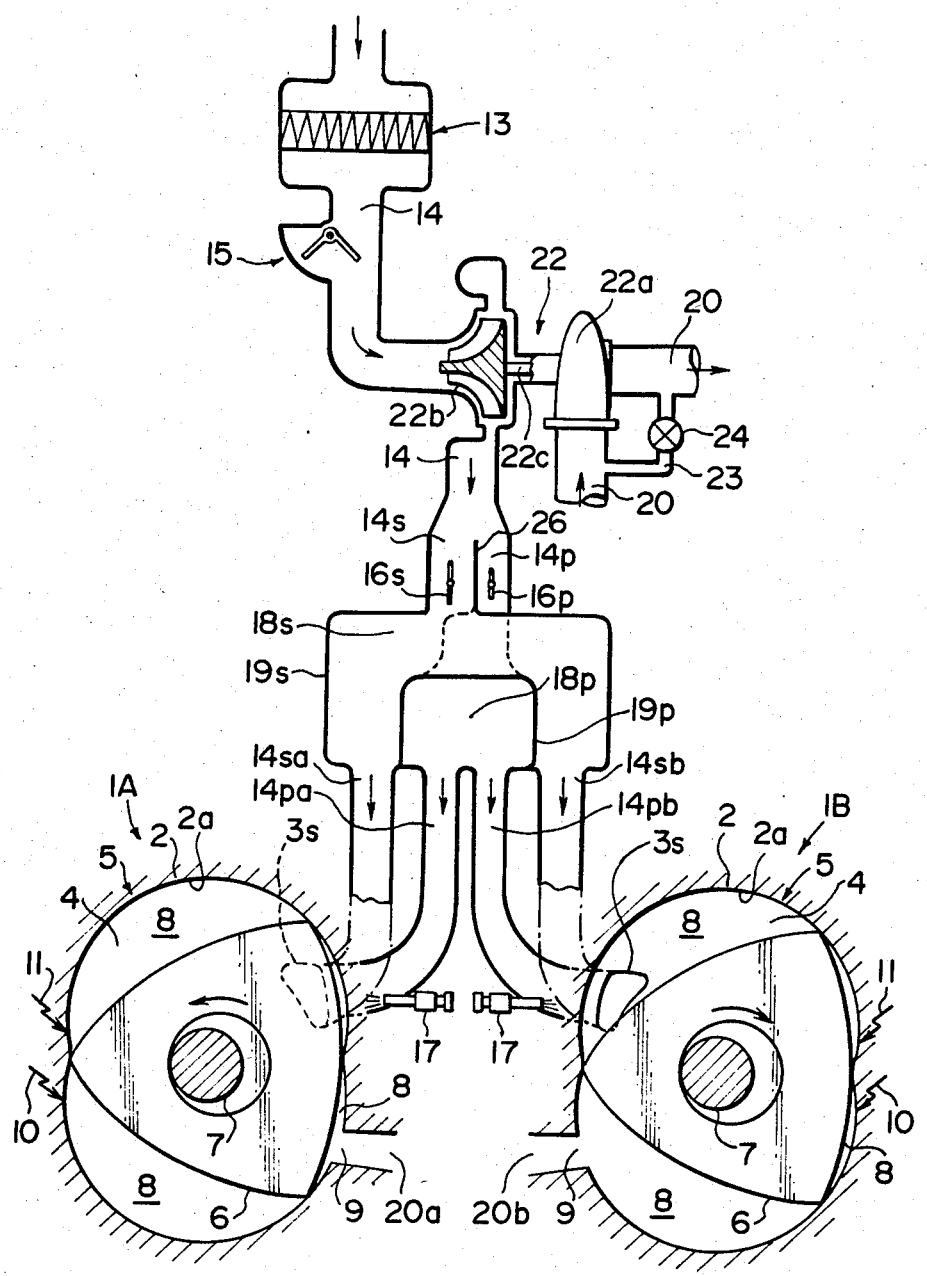
FIG. 4 is a diagrammatic illustration similar to FIG. 1 but showing another embodiment.

Referring now to FIGS. 4 and 5, there is shown another embodiment of the present invention in which the intake system of the engine includes an air cleaner 13 connected with a common intake passage 14 provided with an air-flow detector 15. The common intake passage 14 leads to a primary intake passage 14p and a secondary intake passage 14s. The intake passage 14p is provided with a primary throttle valve 16p which is manually controlled by an engine control member to open in accordance with the engine load. The intake passage 14s is provided with a secondary throttle valve 16s which is opened when the engine control member is actuated further after the primary throttle valve 16p has been substantially fully opened. The primary intake passage 14p leads to a surge tank 19p which is in turn connected with a pair of individual intake passages 14pa and 14pb leading respectively to the intake ports 3p formed in the intermediate housing 4a to open to the respective rotor cavities. In the vicinity of each intake port 3p, the intake passage is provided with a fuel injecting nozzle 17. The surge tank 19p provides a communication passage 18p between the individual intake passages 14pa and 14pb.

The secondary intake passage 14s is connected with a surge tank 19s which leads to a pair of individual intake passages 14sa and 14sb leading respectively to the intake ports 3s provided in the side housings 4 to open to the respective rotor cavities. The surge tank 19s provides a communication passage 18s between the individual intake passages 14sa and 14sb. Each of the individual passages 14sa and 14sb is larger in cross-sectional area than the individual passage 14pa, 14pb. Each of the heavy load intake ports 3s is provided with a rotary type control valve 30 which opens the intake port 3s under a heavy load operation. For the purpose, the control valve 30 is connected with an actuator 31 which functions to open the valve 30 under a heavy engine load and when the engine speed has reached a valve operating speed which is preliminarily determined at a suitable value between 3500 to 5000 rpm.

The intake ports 3s has an opening period of 370° to 320° in terms of angle of rotation of the eccentric shaft 7. The intake port 3s has an opening timing which is the same as or earlier than that of the light load intake port 3p, and a closing timing which is the same as or later than that of the light load intake port 3p. There is also provided a turbo-supercharger 22 which includes an exhaust turbine 22a located in the exhaust manifold 20 and a compressor 22b located in the common intake passage 14. The compressor 22b is connected through a shaft 22c with the turbine 22a as in the previous embodiment. Further, the exhaust manifold is provided with a bypass passage 23 having a waste gate valve 24 as in the previous embodiment. A compression wave is produced at each intake port by the pressure of the residual combustion gas when the intake port is opened. The compression wave is then transmitted through the individual passages and the communication passage to the other intake port. Since the surge tank 19s has a relatively large volume, it is possible to transmit a compression wave from one individual intake passage to the other without any significant attenuation. The overall length L of the individual intake passages 14sa and 14sb and the communication passage 18s is determined at a value between 0.63 and 1.50 m as in the previous embodiment. It is therefore possible to obtain a pressure resonance intake charging effect at the heavy load intake ports 3s.

Although the present invention has been described with reference to specific two-rotor type rotary piston engines, it can well be applied to rotary piston engines having three or more rotors. In case of a threerotor type engine, the rotors are arranged to rotate with 120° phase difference. The overall length L of individual passages for two cavities and the communicating passage between these individual passages is determined by the following formula.

$$L = (\theta - 120 - \theta_o) \times (60/360N) \times C \ldots \quad (2)$$

Figure 8:
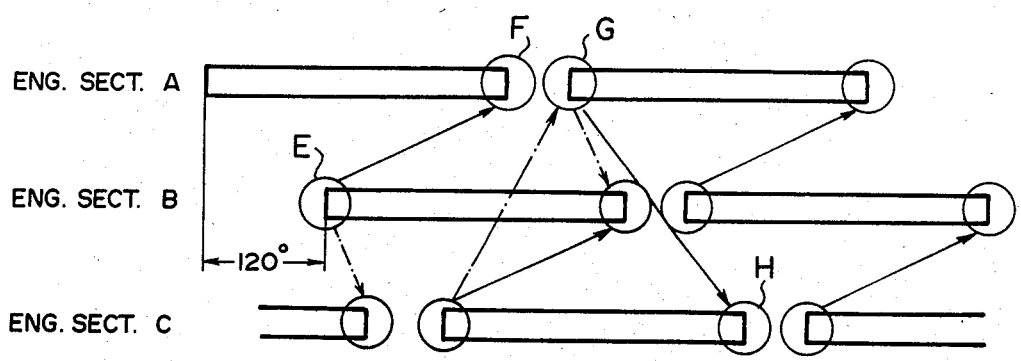

With this design, it becomes possible to obtain an increased charge by utilizing the pressure resonance intake charging effect. As shown in FIG. 8, when the intake port in the engine section B opens, there is produced a compression wave as shown by E which is transmitted as shown by a solid line to the intake port of the engine section A at a timing shown by F. Similarly, the compression wave produced at the intake port in the engine section A as shown by G is transmitted to the intake port in the engine section C as shown by H. Alternatively, the passages may be so formed that the compression wave is transmitted from the engine section B to the engine section C, from the engine section C to the engine section A and from the engine section A to the engine section B as shown by broken lines in FIG. 8.

The invention has thus been shown and described with reference to specific embodiments, however, it should be notd that the invention is in no way limited to the details of the illustrated arrangements but changes and modifications may be made without departing from the scope of the appended claims.

What is claimed is:

1. A multiple rotor type rotary piston engine comprising:
    a casing comprised of
        a plurality of rotor housings, each rotor housing having an inner wall of trochoidal configuration,
        an intermediate housing located between each pair of adjacent rotor housings, and
        a pair of side housings secured to outer sides of outermost rotor housings to define rotor cavities in the respective rotor housings,
    a substantially polygonal rotor disposed in each of the rotor cavities with apex portions in sliding engagement with the inner walls of the respective rotor housings to define working chambers of cyclically variable volumes,
    eccentric shaft means carrying said rotors so that said rotors are rotated with equal phase differences in terms of angle of rotation of said eccentric shaft means,
    intake means including individual intake port means provided in at least one of said intermediate and side housings for opening to the respective rotor cavities and adapted to be cyclically closed by said rotors as the rotors rotate,
    intake passage means including individual intake passage means leading respectively to said intake port means and communicating with each other by communicating passage means,
    supercharging means located in said intake passage means upstream of said communicating passage means,
    exhaust port means provided in said casing for opening to the respective rotor cavities and communicating with exhaust passage means, and
    intake pressure limiting means located downstream from the supercharging means for limiting intake pressure in said intake passage means below a predetermined value for producing an engine operating range where the intake pressure is lower than exhaust gas pressure, said individual passage means and said communicating passage means having a length so that a compression wave, produced at one intake port means for one rotor cavity when said one intake port means is opened, is transmitted to another intake port means for another rotor cavity just before said another intake port means is closed in at least a part of said engine operating range.

2. A rotary piston engine in accordance with claim 1, wherein said supercharging means includes turbo-super-charger means comprising exhaust turbine means disposed in said exhaust passage means to be driven by exhaust gas and compressor means disposed in said intake passage means and driven by said exhaust turbine means.

3. A rotary piston engine in accordance with claim 2, wherein said intake pressure limiting means includes bypass passage means provided in said exhaust passage means to bypass said exhaust turbine means, waste-gate valve means provided in said bypass passage means, and means responsive to the intake pressure in the intake passage means downstream the compressor means to open said wastegate valve means when the intake pressure exceeds said predetermined value.

4. A rotary piston engine in accordance with claim 1 wherein the length of said individual intake passage means and said communicating passage means are 0.63 m to 1.5 m so that the compression wave produced at said one intake port means for said one rotor cavity is transmitted to said another intake port means for said another rotor cavity just before said another intake port means is closed in an engine operating range wherein said exhaust gas pressure is higher than said intake pressure by a predetermined value.

5. A two-rotor type rotary piston engine comprising:
    a casing comprised of
        a pair of rotor housings, each rotor housing having an inner wall of trochoidal configuration,
        an intermediate housing located between the rotor housings, and
        a pair of side housings secured to outer sides of the rotor housings to define rotor cavities in the respective rotor housings,
    a substantially polygonal rotor disposed in each of the rotor cavities with apex portions in sliding engagement with the inner walls of the respective rotor housings to define working chambers of cyclically variable volumes,
    eccentric shaft means carrying said rotors so that said rotors are rotated with 180° phase difference in terms of angle of rotation of said eccentric shaft means,
    intake means including individual intake port means provided in at least one of said intermediate and side housings to open to the respective rotor cavities and adapted to be cyclically closed by said rotors as the rotors rotate, intake passage means including individual intake passage means leading respectively to said intake port means and communicating with each other by communicating passage means, supercharging means located in said intake passage means upstream of said communicating passage means, exhaust port means provided in said casing for opening to the respective rotor cavities and communicating with exhaust passage means, and intake pressure limiting means located downstream from the supercharging means for limiting intake pressure in said intake pressure in said intake passage means below a predetermined value for producing an engine operating range where the intake pressure is lower than exhaust gas pressure, said individual passage means and said communicating passage means having a length of 0.63 m to 1.5 m so that a compression wave, produced at one intake port means for one rotor cavity when said one intake port means is opened, is transmitted to another intake port means for the other rotor cavity just before said other intake port means is closed in at least a part of said engine operating range.

6. A multiple rotor type rotary piston engine comprising:

a casing comprised of
  a plurality of rotor housings, each rotor housing having an inner wall of trochoidal configuration,
  an intermediate housing located between each pair of adjacent rotor housings, and
  a pair of side housings secured to outer sides of outermost rotor housings to define rotor cavities in the respective rotor housings, a substantially polygonal rotor disposed in each of the rotor cavities with apex portions in sliding engagement with the inner walls of the respective rotor housings to define working chambers of cyclically variable volumes, eccentric shaft means carrying said rotors so that said rotors are rotated with equal phase differences in terms of angle of rotation of said eccentric shaft means, intake means including individual intake port means provided in at least one of said intermediate and side housings for opening to the respective rotor cavities and adapted to be cyclically closed by said rotors as the rotors rotate, intake passage means including common intake passage means communicating with separate individual intake passage means leading respectively to said intake port means and communicating with each other by communicating passage means, supercharging means located in said common passage means of said intake passage means, throttle valve means located in said common passage means downstream from the supercharging means, fuel injection means provided in said individual passage means, exhaust port means provided in said casing for opening to the respective rotor cavities and communicating with exhaust passage means, intake pressure limiting means for limiting intake pressure in said common passage means of said intake passage means between the supercharging means and the throttle valve means below a predetermined value for producing an engine operating range where the intake pressure is lower than exhaust gas pressure, said individual passage means and said communicating passage means having a length of 0.63 m to 1.5 m so that a compression wave, produced at one intake port means for one rotor cavity when said one intake port means is opened, is transmitted to another intake port means for another rotor cavity just before said another intake port means is closed in at least a part of said engine operating range.

7. A rotary piston engine in accordance with claim 4, wherein said predetermined value for the difference between the exhaust gas pressure and the intake pressure is 100 mmHg.

* * * * *